US006994359B1

(12) United States Patent  
Silver

(10) Patent No.: US 6,994,359 B1
(45) Date of Patent: Feb. 7, 2006

(54) SNOW-TYPE BIKE

(76) Inventor: Andrew George Silver, 41 Canfield Road, Woodford Bridge, Essex 1GB 8JL (GB)

(*) Notice: Subject to any disclaimer, the term of this patent is extended or adjusted under 35 U.S.C. 154(b) by 0 days.

(21) Appl. No.: 09/786,190

(22) PCT Filed: Sep. 8, 1999

(86) PCT No.: PCT/GB99/02988

§ 371 (c)(1),
(2), (4) Date: Mar. 1, 2001

(87) PCT Pub. No.: WO00/13956

PCT Pub. Date: Mar. 16, 2000

(30) Foreign Application Priority Data

Sep. 8, 1998 (GB) .................................. 9819593

(51) Int. Cl.
*B62B 13/14* (2006.01)
(52) U.S. Cl. ........................ 280/16; 280/21.1
(58) Field of Classification Search ................ 280/845, 280/15, 16, 17, 21, 21.1, 22.1, 24, 28, 28.14, 280/12.1, 12.13, 12.14, 609
See application file for complete search history.

(56) References Cited

U.S. PATENT DOCUMENTS

| 2,883,205 A | * | 4/1959 | Dulski | 280/16 |
| 3,014,731 A | * | 12/1961 | Dworak | 280/16 |
| 3,583,721 A | * | 6/1971 | Doran-Webb | 280/16 |
| 3,771,807 A | * | 11/1973 | Porsche et al. | 280/16 |
| 3,799,565 A | | 3/1974 | Burtis | 280/16 |
| 3,870,330 A | | 3/1975 | Hatano | 280/16 |
| 3,884,484 A | | 5/1975 | Uhlyarik | 280/7.12 |
| 4,014,283 A | * | 3/1977 | Crnogorac | 280/21.1 |
| 4,027,891 A | * | 6/1977 | Frame | 280/16 |
| 4,097,055 A | | 6/1978 | Laycraft | 280/16 |
| 4,101,142 A | * | 7/1978 | Turner | 280/16 |
| 4,168,841 A | | 9/1979 | Uhlyarik | 280/7.12 |
| 4,305,603 A | * | 12/1981 | Müller et al. | 280/609 |
| 4,353,563 A | * | 10/1982 | Foster | 280/24 |
| 4,466,626 A | | 8/1984 | Leritz | 280/12.14 |
| 5,000,466 A | * | 3/1991 | Den Hartog | 280/21.1 |
| 5,482,302 A | | 1/1996 | Yu | 280/12.12 |

FOREIGN PATENT DOCUMENTS

| FR | 2521937 | 8/1983 |
| WO | 9514602 | 6/1995 |

* cited by examiner

*Primary Examiner*—Frank Vanaman
(74) *Attorney, Agent, or Firm*—Ladas and Parry LLP

(57) ABSTRACT

A ski vehicle including (a) a seat; (b) a steering mechanism for steering the ski vehicle; (c) a frame; (d) a forward ski member attached to the steering mechanism; (e) a rear ski member; (f) pivotal attachments for pivotally attaching the rear ski member to the frame at longitudinally spaced locations on the rear ski member to permit the rear ski member to flex between the spaced locations; and (g) a footrest for supporting the feet of a user, footrest extending on each side of the frame and being disposed between the seat and the rear ski member.

16 Claims, 5 Drawing Sheets

SNOW-TYPE BIKE

FIELD OF INVENTION

This invention relates to a snow-type bike sometimes known as a ski bob or snowscoot.

Snow-type bikes have become popular with snow sport enthusiasts, and a known bike, more particularly a ski bob, is shown in FIG. 1. This known snow-type bike has a frame 1 formed of a crossbar 2 to which is secured a seat pillar 3 and a handlebar headset 4. Pivotally mounted in the headset is a handlebar column 5, the lower end of which is pivotally mounted in the headset and the upper end of the column 5 is secured to a pair of user-operable handlebars 6. The handlebars are connected through the column 5 in the headset 4 to a column 7 that is connected via a suspension unit 8 to a forward ski 9. The pillar 3 is attached to a seat saddle 10 and the saddle is attached by a strut 11 to a rearward end of a rear ski 12 through a suspension unit 14, the forward end of the rear ski 12 being attached by a support member 13 to the headset. The terms "forward" and "rear" used herein refer to directions in use, i.e. leading and trailing. Such a known ski bob is ridden by a user who wears a pair of foot skis 15 so as to stabilise the user. Thus, in use, the ski bob is ridden and steered by a user via the forward ski 9 and, of necessity, has their feet on the snow through the intermediary of the foot skis for stability.

BACKGROUND OF INVENTION

A further form of snow-type bike, which is known as a snowscoot, is shown in FIG. 2. In this form of device, there is an inverted Y-shaped frame 20 connected to a headset 24 which pivotally locates a column 25 supporting a pair of handlebars 26. The lower end of the column 25 is connected to a pair of forks 27 with a lower end of the forks being connected to a forward ski 29. The frame 20 has a frame member 21 laterally centrally secured to a forward end of a rear ski 30 and another frame member 22 laterally centrally connected toward a rearward end of the rear ski 30. The rear ski 30 supports a platform 31 having an upturned rear end and at a forward end is located a strap 32 for securing a user's feet, in use located one on each side of the frame member 22. In use of the device of FIG. 2, a user stands with both feet on the rear ski 30 and steers the device by the handlebars 26.

It is known that users of BMX bikes like to jump over obstacles and to perform freestyle movements of the bikes and of themselves when in mid-air, and a similar desire exists with snow enthusiasts. Neither of the forementioned devices are able to permit such freestyle use to the level and style found in BMX-ing. In the former device of FIG. 1, a user, of necessity, has to use a pair of foot skis because the rear ski 12 is too narrow to support a user, and in the snowscoot of FIG. 2 a user's feet are secured to the rear ski which may cause a user injury in a crash. Furthermore, the snowscoot of FIG. 2 does not have a seat.

SUMMARY OF INVENTION

U.S. Pat. No. 4,097,055, FR-A-2 521 937 and U.S. Pat. No. 3,870,330 disclose a snow-type bike having a frame supporting a seat for a user and located beneath the seat is a rear ski member. A forward ski member is attached to a handlebar steering member. Footrests extend on each side of the frame at a location between the seat and the plane of the rear ski member. However, in such prior art arrangements the rear ski member is fixedly secured to the frame and, as a result, not only are such snow-type bikes uncomfortable but also the rear ski member tends to fracture in use.

The present invention seeks to at least partially mitigate the foregoing disadvantages.

According to a first aspect of this invention there is provided a snow-type bike for use in snow comprising frame means supporting seat means for a user and steering means, said frame means having a longitudinal axis, a rear ski member attached to said frame means, a forward ski member attached to said steering means, the attachment of said rear and forward ski members being on said longitudinal axis and the attachment of the frame means to the rear ski member being at longitudinally spaced locations of the frame means, and footrest means extending on each side of the frame means at a location between said seat means and the plane of said rear ski member, characterised by means being provided for permitting the rear ski member to flex between said spaced locations.

Preferably, footrest means is fixedly located on said frame means or on said rear ski member.

Preferably, the forward and rear ski members have a width two or more times, preferably four times, the width of a normal recreation ski.

Conveniently, the front and rear ski members have the same width.

Preferably, said frame means comprises first and second frame members each joined at a respective first end thereof to a headset member and joined at a second, opposed end thereof to a third frame member, said third frame member being located substantially parallel to said rear ski member, said third frame member carrying said footrest means.

Preferably, the footrest means comprise a pair of footrests extending one on each side of said frame means.

Conveniently, the vicinity of the juxta position of the first and third frame members and the second and third frame embers forms a securing location of the frame means to the rear ski member.

Advantageously, the first frame member supports the seat means.

Preferably, the headset pivotally supports the steering means which comprises a pair of handlebars attached to at least one fork member, a lower end of at least one fork member being attached to the forward ski member.

Advantageously, a pair of fork members are provided.

Advantageously, the handlebars at a location in the vicinity of the headset are shaped and spaced to accommodate a drag lift or other tow lift.

Preferably, the fork members are pivotally attached directly or indirectly to the forward ski member.

Advantageously, the forward ski member is pivotally attached to the fork members for movement about at least one of an axis which is transverse to the longitudinal direction of the frame means and an axis which is along the longitudinal direction of the frame means, both said axes being defined when the forward and rear ski members are aligned.

Advantageously, the rear ski member is pivotally attached to the frame means for movement about a longitudinal axis of the frame means.

In an embodiment of the invention the frame means is attached to the rear ski member by suspension means and, advantageously, the steering means may be attached to the forward ski member through the intermediary of one or more suspension members.

Where the front ski member is pivotally connected to the steering means, preferably means are provided for damping pivotal motion of said front ski member.

Advantageously, the frame means is attached to the rear ski member at longitudinally spaced locations of the frame member and means are provided for permitting the rear ski member to flex between said spaced locations.

Preferably, said footrest means include an abrasive upper foot engaging surface.

In this invention the footrest means are located above the rear ski member giving substantial room for a user's feet to extend over the edge of the rear ski member, if desired, without the user's feet hitting the ground. A user is, thus, able to stand on the footrest means with their legs slightly apart giving a more natural stance during normal riding. The invention has the following advantages:

1. A user can absorb greater vertical impact from a jump without exerting masses of forward or backward lean which impairs control and stability.
2. A user can take greater vertical impact from a jump, absorbing the pressure through the bike and the user's legs simultaneously.
3. A user can ride over rough ground more freely.
4. A user's feet are not restricted by skis, as in FIG. 1, or a strap, as in FIG. 2, so that a user is able to perform a greater number of popular freestyle manoeuvres.
5. Without the requirement of skis on a user's feet, as in FIG. 1, or the strap of FIG. 2, a user is less likely to sustain leg injury.
6. A user who has larger feet or who is wearing warmer, bulkier footwear will not have their performance restricted as in the prior art.

BRIEF DESCRIPTION OF THE DRAWINGS

The invention will now be described, by way of example, with reference to the accompanying drawings in which.

DETAILED DESCRIPTION

Figure 1:
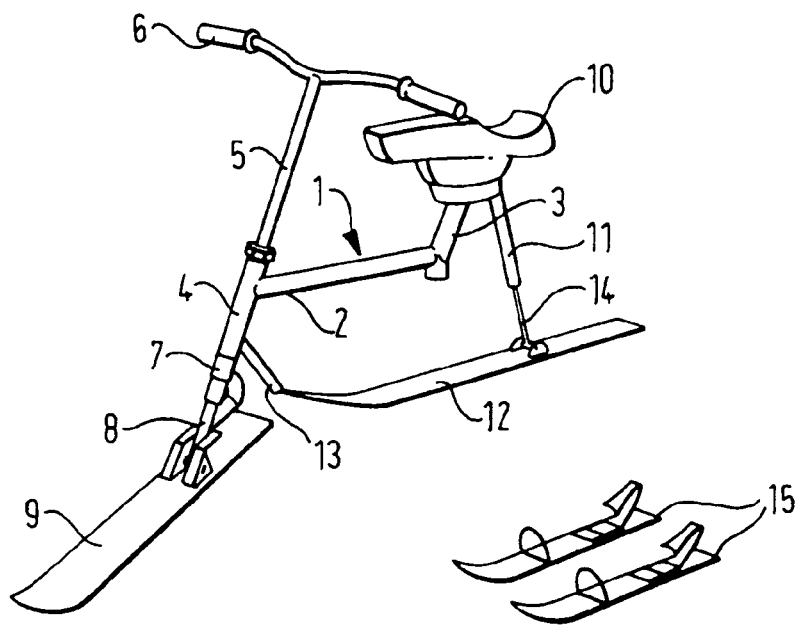
FIG. 1 shows a perspective view of a prior art snow-type bike known as a ski bob.
Figure 2:
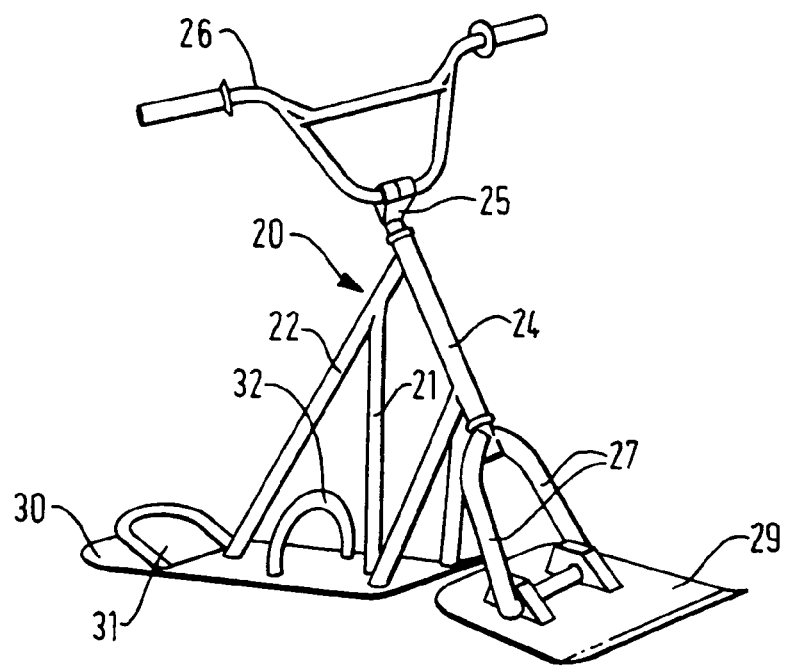
FIG. 2 shows a perspective view of a another prior art snow-type bike known as a snowscoot.

In the Figures like reference numerals denote like parts.

Figure 3:
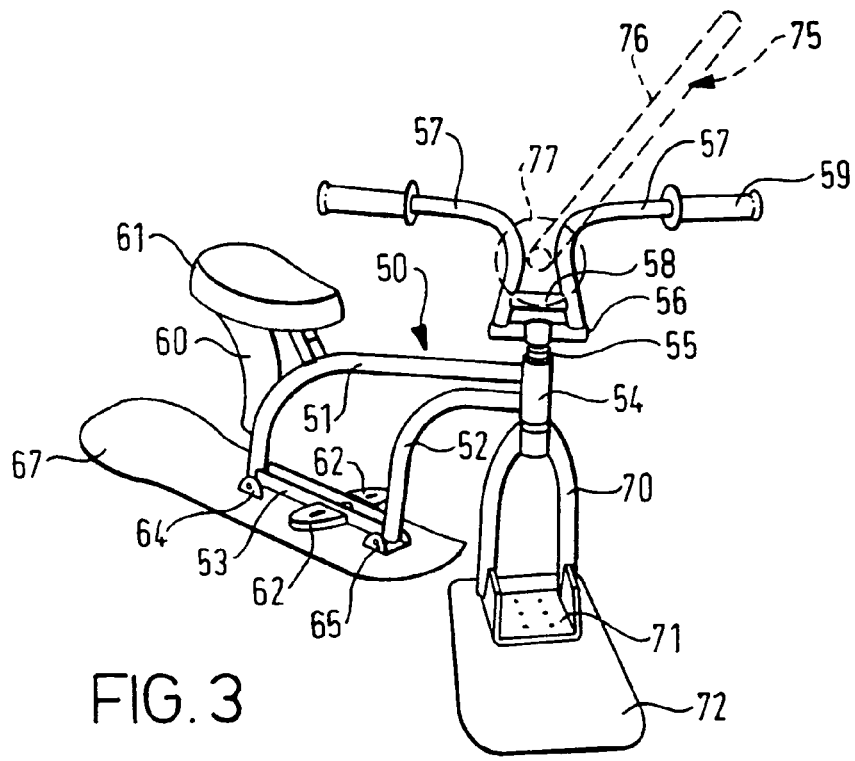
FIG. 3 shows a perspective view of a snow-type bike in accordance with this invention, known as a BOARD-BIKE™.
Figure 4:
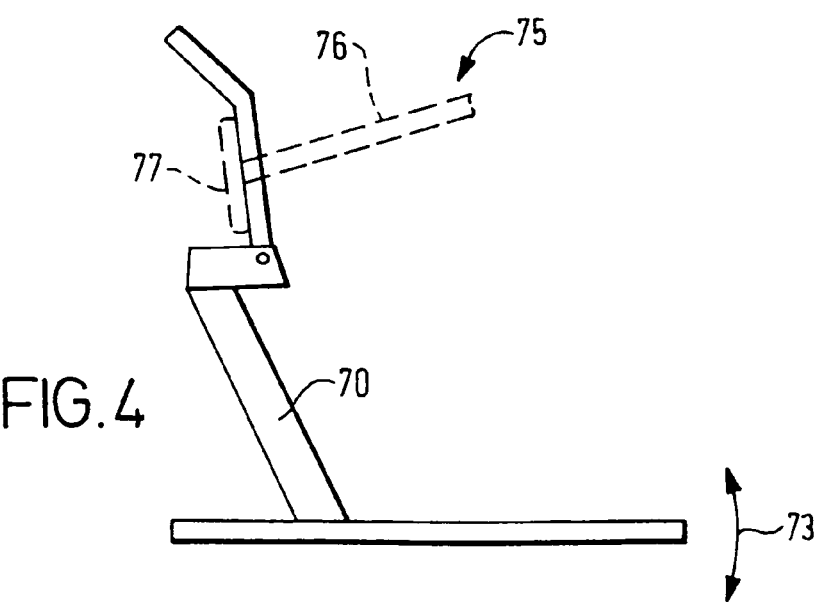
FIG. 4 shows a partial side view of the snow-type bike of FIG. 3.

The snow-type bike shown in FIGS. 3 and 4 has a frame 50 formed of a first member 51 which forms a cross bar and a seat securement member, a second frame member 52 and a third frame member 53, the third frame member having opposed ends attached to respective ends of the first and second members 51, 52. Opposed ends of the frame members 51, 52 are secured to a headset 54. The headset pivotally locates a handlebar stem 55 which forms a T-section with a cross member 56. Opposed ends of the cross member 56 are attached to a respective one of a pair of user-operable handlebars 57 which are braced in the vicinity of the cross member 56 by a bar 58. The outer ends of each handlebar 57 are provided with a hand grip 59. The first member 51 carries at least one stay 60 and, preferably, there are two such stays 60 which support a seat 61. The third frame member carries, on each lateral side thereof, a footrest 62 preferably having an abrasive upper foot engaging surface, e.g. spikes, for a user, the lateral width of the footrest depending on the size of the bike, which, in turn, will depend upon the size of a user. It is envisaged that the footrests 62 will be substantially the width of a user's footwear, although a slightly narrower footrest could be used, provided that the footrest was comfortable to a user. The footrest may, if desired, be located on an upper surface of the rear ski member.

Secured in the vicinity of the juxta position of the first and third frame members and the second and third frame members via brackets 64, 65 is a rear ski member 67 which is substantially parallel to the third frame member 53. The rear ski member, preferably, has upturned front and rear ends and the rear ski member has a width substantially the same as that of the overall width of the footrest. However, if the footrest is located a sufficient height above the rear ski member, the footrest lateral width may be greater than that of the rear ski member. The reason for the rear ski member having substantially the same width as the footrest is so that the footrests do not contact the snow when cornering. Footrests are provided since, if a user places his or her feet directly on the rear ski member 67, the board forming the rear ski member flexes and the load imparted by the user's feet on the rear ski member affects directional stability.

The stem 55 is preferably connected through bearings or bushes in the headset 54 to a pair of front forks 70, although it is possible that a single fork member may be provided. The lower ends, in use, of the forks 70 are located in a U-shaped bracket 71 that attaches the forks to a forward ski member 72. The forward ski member 72 may have an upturned front portion and the rear portion of the forward ski member 72 may also be upturned. The connection between the forks and the forward ski member 72 may be pivotally located to permit the ski member to move in the direction of double arrow-headed lines 73, shown in FIG. 4.

Preferably, the forward and rear ski members have a width two or more times, preferably four times, the width of a normal recreation ski.

Conveniently, the front and rear ski members have the same width. However, as shown in FIG. 3, a rear portion of the rear ski member 67 located rearwardly of the rear most bracket 64 is arranged to be wider than the remainder of the member 67 which remainder has a substantially constant width.

It is also envisaged that the frame 50 and the front fork 70 may be attached to the rear and forward ski members by joints which permit the ski members to remain horizontal while the frame and forks tilt with respect thereto about a longitudinal axis of the frame, e.g. when cornering.

The handlebars 57 are shaped and arranged so as to accommodate between the respective handlebars a drag lift 75, or other tow lift, shown in broken lines in FIGS. 3 and 4. In this respect, the handlebars are spaced so as to accept the drag lift pole 76, but to retain an end 77 which may be an enlarged circular end, as shown, or a T-shaped end, so that the board bike may be carried up a slope by a drag lift.

Although not shown in FIGS. 3 and 4, the frame could be mounted onto the rear ski member via the intermediary of suspension means and similarly the front forks 70 may be attached to the forward ski member by suspension means.

Figure 5:
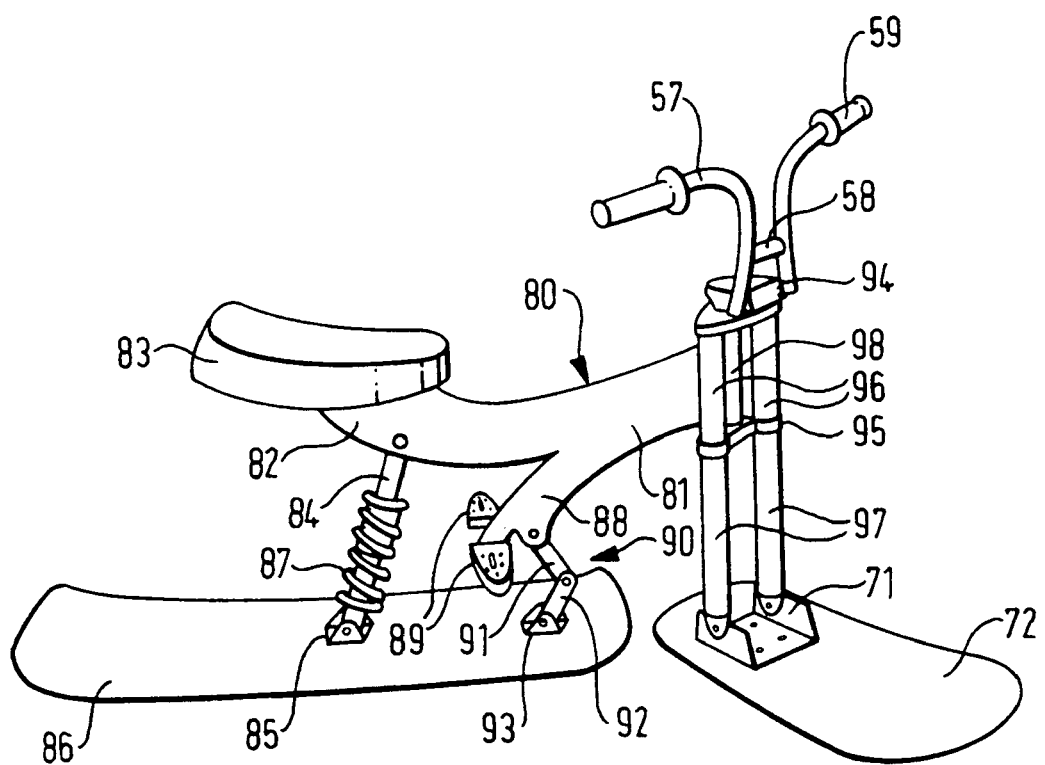
FIG. 5 shows a perspective view of a second embodiment of the present invention.

Referring to FIG. 5, a second embodiment of the invention is shown in which the frame is mounted on the rear ski member via a suspension.

The snow-type bike of FIG. 5 has a frame 80 formed in the shape of a letter Y, the stem 81 of the Y-shape having one end attached to a headset 98, a first limb 82 of the Y-shape being secured to a seat 83 and via a suspension device including a pneumatic or hydraulic strut 84 to a pivot in a bracket 85 secured to a rear ski member 86. The strut 84 is pivoted at its upper end to the first limb 82 and the strut is held in expansion by a compression spring 87. Another limb 88 of the Y-shape is bifurcated with one portion of the bifurcation being attached to footrests 89 located on respective opposing sides of the limb 88 and the other portion of the bifurcation is pivotally mounted to a link device 90. The link device 90 is formed of a first link 91 that has one end pivotally attached to the limb 88 and the other end thereof is pivotally attached to a further link 92, the link 92 being pivotally located in a U-shaped saddle member 93 that is secured to a forward end of the rear ski member 86.

The headset 98 pivotally supports the handlebars 57. The headset 82 is positioned intermediate an upper triangular member 94 and a lower triangular member 95 at the apex of the members 94, 95 with a pair of pillars 96 being provided as supports at a respective corner of the members 94, 95. Axially located below each of the pillars 96 on an opposite side of the lower triangular member 95 is a pair of front telescopic struts 97 which may be spring mounted. A lower end of the struts 97 are pivotally located on the U-shaped bracket 71 which is secured to the forward ski member 72.

In this embodiment, the rear ski member 86 is suspended to the frame 80 and the forward ski member 72 is also suspended to the steering mechanism by the struts 97. The front suspension in this embodiment is, however, optional.

The upper, foot engaging, surface of the footrests 62 and 89 may be provided with a high friction surface such as protruding spikes.

It will be understood that by having footrests located, in use, above the rear ski member 61, 86, so a user may lean the board bike when negotiating a turn or bend without the user's feet contacting the ground, the amount of lean being dependent upon the height of the footrests above the rear ski member and the width of the rear ski member in relation to the width of the footrests although, as herein stated above, the width of both the rear and front ski members is more than twice and, preferably, four times the width of a normal recreational ski. The use of raised footrests also improves use of the snow-type bike for a user with larger feet or bigger boots.

Figure 6A:
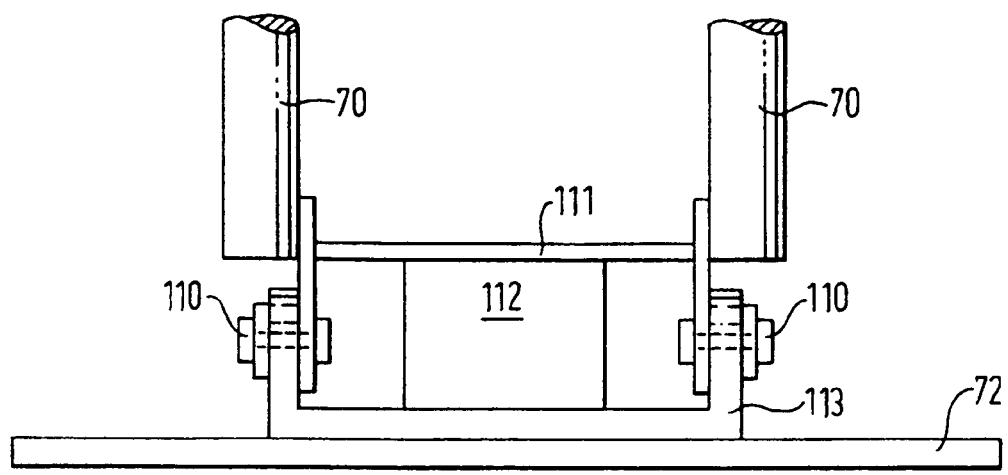
FIGS. 6(a) and 6(b) show mutually orthogonal partial views of an alternative embodiment of a snow-type bike of this invention having a damper for pivotal motion of the forward ski.
Figure 6B:
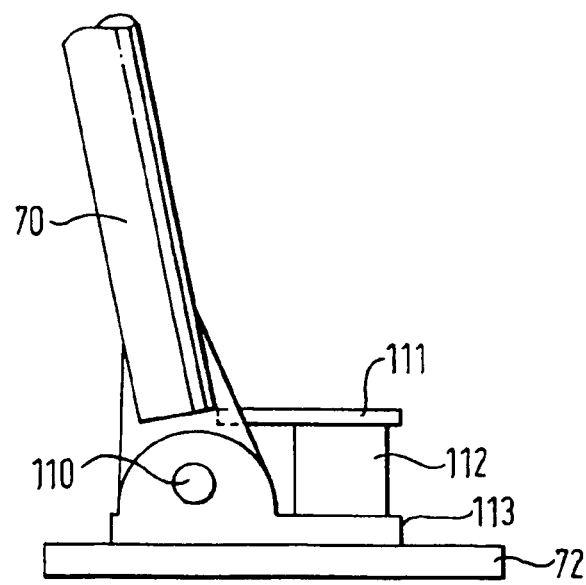

A damper for a pivoting forward ski member is shown in FIGS. 6(a) and 6(b). The forks 70 are each pivotally attached by axles 110 that extend transversely to the longitudinal axis of the frame (the axis being defined when the forward and rear ski members are in alignment) to a transverse member 111 interconnecting the forks. Located below, in use, the member 111 is an elastomeric or rubber or other suitable resilient block 112, acting as a damper, although it is to be understood that any suitable shock absorbing means known per se may be alternatively used. The block 112 is mounted on a plate 113 for transmitting load to the forward ski 72 at a location forward of the axles 110. Not only does the damper block 112 damp pivoting of the forward ski, but it also permits a more controllable use of the snow-type bike, and also assists in reducing fracture of the forward ski member 72.

Figure 7:
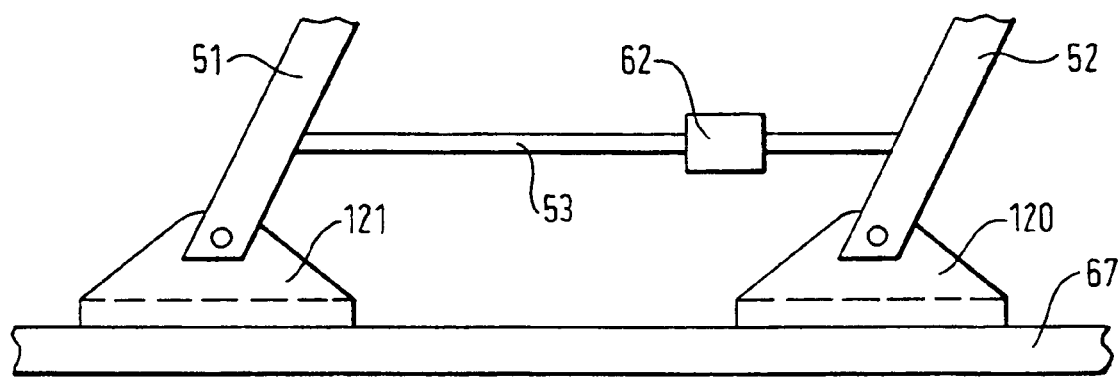
FIG. 7 shows a partial side view of a rear ski member securement to a frame in an alternative embodiment of the snow-type bike of this invention.

If the frame members 51 and 52 are fixedly secured to the rear ski member 67, it is possible that fracture of the rear ski member may occur. So as to reduce the risk of such fractures, the frame members 51 and 52 are fixedly or pivotally connected, as shown in FIG. 7, to a forward (in use) bracket 120 and a rearwardly mounted bracket 121, the brackets 120, 121 being secured to the rear ski member 67 by rivets or bolts acting through resilient (e.g. rubber or elastomeric) bushings. Alternatively, the brackets 120, 121 may have a resilient member sandwiched between a lower surface of the brackets and an upper surface of the rear ski member 67.

Figure 8:
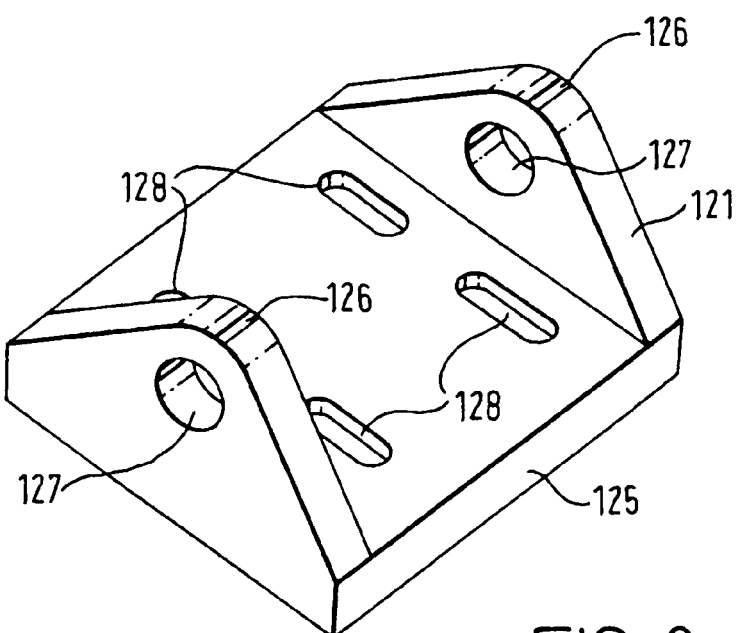
FIG. 8 shows a perspective view of a bracket used in the embodiment of FIG. 7.

One of the brackets 121 is shown in detail in FIG. 8. The bracket has a generally U-shaped form having a base 125 and opposed side faces 126 each with a hole 127 for securement to the frame members 51, 52. In a longitudinal direction of the frame the bracket has two pairs of slots 128 extending through the base 125. The bracket 120 may also have similar slots 128 or may, alternatively, simply have circular holes. The slots 128 are fixing apertures for the bolts/rivets for attachment of the frame to the rear ski member 67. Because of the provision of slots 128, so the fixings which are resiliently mounted, and which are securely fixed to the board, are able to move with respect to the bracket 121. Thus, if there should be flexing of the rear ski member 67, such flexing is permitted by virtue of the slots 128.

Although this invention has been described in relation to a snow-type bike for use in snow, it is envisaged that the BOARDBIKE™ could be used on water or a man-made ski slope, if so desired.

The present invention outperforms the snowscoot in its ability to turn more easily. This is due to the seat which is in a position that enables the user to lean against the frame with the inside of his or her leg to turn the bike effortlessly. The snowscoot does have a down frame member for this purpose, but it is not as effective.

On a snowscoot the user has to be right over the front thereof to make full use of the down frame member and once a rider leans backwards, the frame member disappears from their range. Even when in range, the amount of leverage gained from the frame member is not as much as when leaning against the BOARDBIKE™. This is because the seat of this invention may be soft and wide and a user of any size can use it to get leverage in all riding positions, even when they are leaning backwards away from the bike.

The invention claimed is:

1. A ski vehicle comprising:
   (a) a seat;
   (b) steering means for steering the ski vehicle;
   (c) frame means for supporting the seat and the steering means;
   (d) a forward ski member attached to the steering means;
   (e) a rear ski member;
   (f) pivotal attachment means for pivotally attaching the rear ski member to the frame means at longitudinally spaced locations on the rear ski member to permit the rear ski member to flex between said spaced locations and to permit pivotal movement between the rear ski member, the pivotal attachment means and the frame means only at said spaced locations; and (g) footrest means for supporting the feet of a user, said footrest means extending on each side of the frame means and being disposed between the seat and said rear ski member, wherein said frame means comprises first and second frame members each joined at respective first ends thereof to a headset member and joined at second ends thereof to a third frame member, said third frame member being disposed substantially parallel to said rear ski member, said third frame member carrying said footrest means.

2. A ski vehicle as claimed in claim 1, wherein the footrest means is fixedly located on said frame means.

3. A ski vehicle as claimed in claim 1, wherein the front and rear ski members have the same width.

4. A ski vehicle as claimed in claim 1, wherein the footrest means comprise a pair of footrests extending on opposite sides of said frame means.

5. A ski vehicle as claimed in claim 1, wherein the pivotal attachment means attach the rear ski member to the frame means adjacent ends of said third frame member.

6. A ski vehicle as claimed in claim 1, wherein the first frame member supports the seat.

7. A ski vehicle as claimed in claim 1, wherein the headset pivotally supports the steering means, the steering means comprising a pair of handlebars attached to at least one fork member, a lower end of the at least one fork member being attached to the forward ski member.

8. A ski vehicle as claimed in claim 7, comprising a pair of fork members.

9. A ski vehicle as claimed in claim 7, wherein the handlebars are disposed in a vicinity of the headset and are shaped and spaced to accommodate a drag lift or other tow lift.

10. A ski vehicle as claimed in claim 8, wherein the fork members are pivotally attached directly or indirectly to the forward ski member.

11. A ski vehicle as claimed in claim 8, wherein the forward ski member is pivotally attached to the fork members for movement about at least an axis which is transverse to the longitudinal direction of the frame means, said axis being defined when the forward and rear ski members are aligned.

12. A ski vehicle as claimed in claim 1, wherein the steering means is attached to the forward ski member by one or more suspension members.

13. A ski vehicle as claimed in claim 1, wherein the front ski member is pivotally connected to the steering means, the ski vehicle comprising means for damping pivotal motion of said front ski member.

14. A ski vehicle as claimed in claim 1, wherein said footrest means includes abrasive upper foot engaging surfaces.

15. A ski vehicle as claimed in claim 1, wherein a rear portion of the rear ski member located rearwardly of a rearmost attachment to the frame means is arranged to be wider than a remainder of the rear ski member, which remainder has a substantially constant width.

16. A ski vehicle as claimed in claim 1, wherein the pivotal attachment means attach the rear ski member to the frame means at two longitudinally spaced locations on the rear ski member and permit the rear ski member to pivot with respect to the frame means only at said two spaced locations.

* * * * *